July 5, 1949.  M. N. YARDENY  2,475,271

MULTISPEED SELECTOR MECHANISM

Filed Dec. 10, 1943

MICHEL N. YARDENY
INVENTOR

BY
John P. Nikonow
ATTORNEY

Patented July 5, 1949

2,475,271

UNITED STATES PATENT OFFICE 2,475,271

MULTISPEED SELECTOR MECHANISM

Michel N. Yardeny, New York, N. Y.

Application December 10, 1943, Serial No. 513,731

3 Claims. (Cl. 318—33)

My invention relates to control apparatus and has particular reference to control apparatus employing a plurality of control elements or selectors for placing a controlled object into one of several predetermined or preselected positions.

This is continuation in part of my application Serial No. 511,457 filed November 23, 1943.

In the electrical control systems such as are disclosed in my foregoing application, metal segments are usually provided, separated by a gap and engaged by a contactor which establishes electrical connections for a driving motor, direction of rotation being controlled by the position of the contactor on one or the other of the segments, the motor being stopped by the contactor or contact arm bridging the gap, thereby energizing both segments and stopping the motor. Each segment in such a system controls rotation of the controlled object through about 180°.

I have found, however, that by using specially arranged relays, it is possible to employ a single full size segment for one direction of rotation, using a blank or insulated space for the other direction of rotation, and only adding a small contact point or element at the gap for stopping the motor.

As an added advantage in this system, the added contact point can be used for changing the speed of the motor, preferably reducing the same, so as to facilitate stopping of the motor and for preventing its oscillations or hunting.

My system can be used with motors of various types such as series or shunt wound, the contact point being arranged to control supplementary relays, changing motor field winding for reducing speed near the gap by increasing field ampereturns.

My invention is more fully described in the accompanaying specification and drawing in which.

Figure 1:
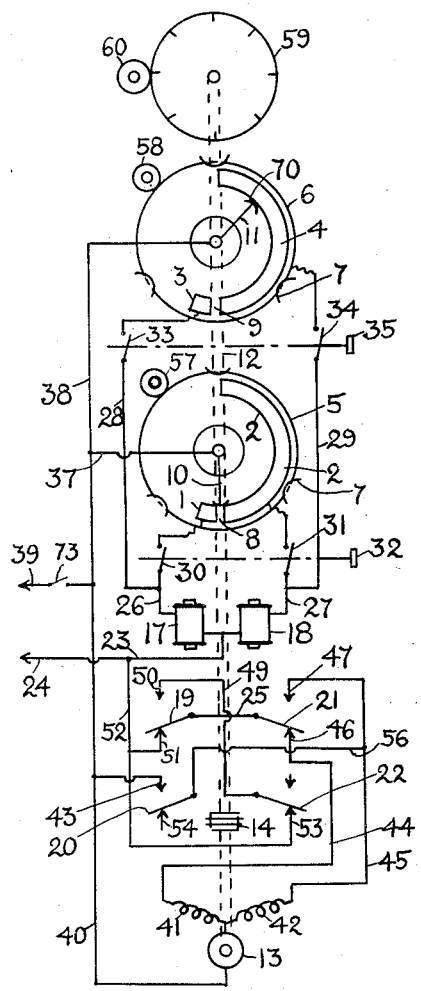
Fig. 1 is a diagrammatic view of my system shown with a series wound motor.

My control system in one of its modifications illustrated in Fig. 1 consists of a plurality of control elements, each element consisting of metal segments 1, 2 and 3, 4 mounted on insulation discs 5, 6 and supported on stationary posts or bearings 7 in spaced relation to each other. Two such elements are shown but in practice a larger number may be used as, for instance, when the device is employed for tuning a radio receiver to different wave lengths from transmitting stations.

The segments are separated by narrow gaps 8, 9 which may be bridged by contact arms 10, 11, respectively, all the arms being rigidly mounted on a common shaft 12, operatively connected with a motor 13, preferably through a suitable speed reducing transmission (not shown).

The motor is controlled by the position of the contact arms in relation to the segments through a pair of relay magnets 17, 18 of a double throw type, the magnet 17 operating contact arms 19, 54 and the magnet 18 operating contact arms 21, 53, the arms 19, 21 being connected together by a lead 25.

The magnet coils are connected together by a lead 23, extending to a terminal 24 of a source of current, the other ends of the coils being connected by leads 26, 27 with the segments 1, 2 and by leads 28, 29 with the segments 3, 4.

It should be noted that the members 1, 2, 3 and 4 are designated "segments" for convenience, and they may be of any suitable shape; they may also be arranged in a straight line, the contact arm being then operated by a suitable mechanical transmission for rectilinear movement over the segments.

Switches 30, 31 are provided in the leads 26, 27 with a common handle 32, operated manually or otherwise. Similar switches 33, 34 are provided in the leads 28, 29 with a handle 35.

The contact arms 10, 11 are connected by leads 37, 38 with the other terminal 39 of the source of electric current.

One terminal of the motor armature 13 is connected by a lead 40 with the terminal 39 of the source of current, the other armature terminal being connected to two series field windings 41, 42, the winding 42, when energized, causing the motor to rotate the contact arms in a clockwise direction, as viewed on the drawing, and the winding 41, when energized, will cause the motor to turn the contact arms in a counterclockwise direction, in all cases for bringing the energized contact arm to the corresponding gap 8 or 9.

The ends of the motor windings 41, 42 are connected by leads 44, 45 with contact point 46, 47, the point 47 being also connected by a lead 56 with the arm 20. The arm 22 is connected by a lead 49 with a point 50. The arms 19, 21 normally (i. e., when the relay coils 17, 18 are deenergized) engage points 51 and 46 respectively, the point 51 being connected by a lead 52 with the terminal 24 and with a contact point 53, normally engaged by the arm 22. The arm 20 normally engages a blind point 54.

With the connections as shown, if the main switch 73 is closed and the switches 33, 34 for instance, are closed by the handle 35 and switches 30, 31 opened, relay 18 will be energized through leads 38, 29 and 23, attracting the arms 21, 22. Current will flow from the terminal 24 through the lead 52, point 51, arm 19, lead 25, arm 21, point 47, lead 45, winding 42, armature 13, and lead 40 to the other terminal 39. The motor will turn in a direction for moving the arm 11 toward the gap 9. As soon as the gap 9 is bridged by the arm 11, engaging the short segment 3, the second relay will be also energized, attracting the arms 19 and 20. Both points 51 and 53 of the terminal 24 will be disconnected and the motor will be deenergized and stopped.

To facilitate stopping of the motor, the latter may be provided with an automatic electromagnetic clutch for disconnecting the drive (transmission or shaft 12) from the armature, and with an automatic brake for stopping the drive when the motor is disconnected as described in my foregoing copending application.

For suppressing hunting of the motor and of the moving parts when the gap is reached by the contact arm, the contact arm may be provided with a rounded contact point and the segments may be provided with a seat at the gap for yieldably retaining the rounded projection, as described in my copending application Serial No. 357,660, filed September 20, 1940 and now Patent 2,342,717 issued February 29, 1944; a frictional coupling 12 may be also provided as described in my copending application Serial No. 490,767 filed June 14, 1943, now abandoned having a plurality of sliding discs with a limited amount of relative motion for absorbing the motor inertia after every reversal of its rotation.

It is possible, therefore, for the contact arm to be retained in the gap while the motor overruns the gap by inertia. In practice the motor usually at first drags the contact arm beyond the gap and the rotation is thereby reversed while the energy is being absorbed by the frictional clutch. On the next reversal, the contact arms will remain in the gap and the inertia of the motor or of the transmission will be absorbed by the friction coupling. The stopping will be expedited if the automatic clutch in the motor is used as explained above.

As further means for preventing hunting of the motor, arrangement is provided for slowing down rotation when the gap is approached, thereby materially reducing inertia of the moving parts. This is accomplished by connecting the second motor winding in parallel with the armature when the contact arm engages the short segment 1. The arms 21, 22 will then return to their original positions on the points 46, 53, respectively, and the arms 19, 20 will be raised and brought in contact with the points 50 and 43, the latter being connected with the lead 40. Current will then flow from the terminal 24 through the lead 52, point 53, arm 22, lead 49, point 50, arm 19, lead 25, arm 21, point 46, lead 44, winding 41, armature 13 and terminal 39 through the lead 40. At the same time, current will flow from the winding 41 through the winding 42 (in such direction as to increase the magnetic field) leads 45, 56, arm 20, point 43, lead 40 and terminal 39. The two windings will be therefore connected in the circuit, building up a correspondingly stronger magnetic field and reducing the speed of the motor. The motor is slowed down in this manner when the contact arm 10, 11 engages the short segment, facilitating stopping of the motor when the gap is bridged by the contact arm. The motor, therefore, will stop when the contact arm reaches the gap moving at a slow speed over the short segment.

Positions of the discs 5 and 6, i. e., gaps 8 and 9, can be adjusted by friction (or geared) wheels 57, 58, engaging the discs. The wheels can be rotated manually for placing the discs in an exact desired position.

Position of the shaft 12 can be indicated by a disc 59, graduated in degrees of a circle or in other suitable units of measurement. A frictional (or geared) wheel 60 may be provided for manually rotating the shaft 12, if desired.

It is understood that the motor may be connected to rotate the discs 5 and 6, the shaft 12 being then manually adjustable. Such an arrangement is a full equivalent of the arrangement shown in Fig. 1.

The shaft 12 can be used to operate a suitable load such, for instance, as a radio tuning device (not shown).

Figure 2:
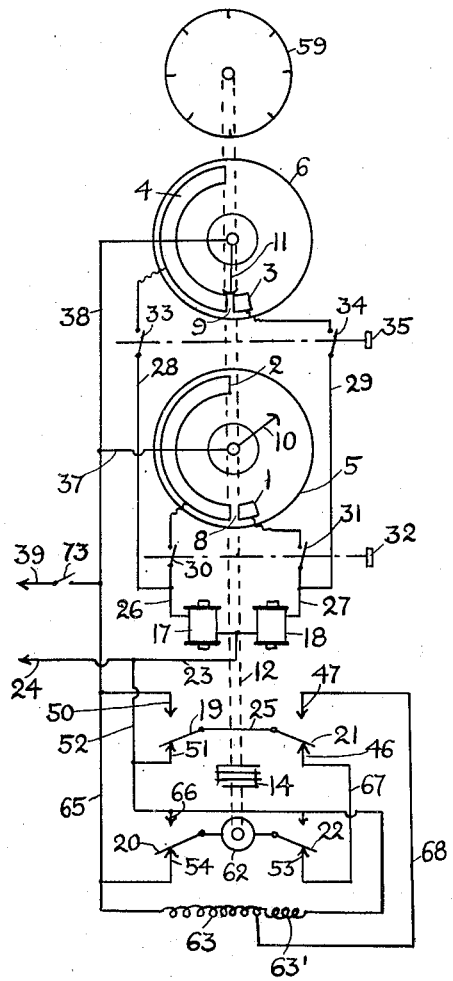
Fig. 2 is a similar view of a system employing a shunt wound motor.

A modified system is shown in Fig. 2 used with a shunt wound motor. The motor armature 62 is connected in series with the relay arms 20, 22, the shunt field windings 63, 63' being connected with the terminals 24, 39 by leads 52, 65. The field winding 63' has a less number of turns than the main winding 63 and is wound in the opposite direction in order that the field strength is weakened when both windings are energized in the normal operation of the motor at normal speed. The auxiliary winding 63 is de-energized, in the manner explained above, to increase field strength and hence reduce speed of motor rotation.

When a selected energized contact arm engages the corresponding segment, the arms 19, 20 will be attracted by the energized relay 17 and will engage the contact points 66, 50, respectively. Current will flow from the terminal 24 through the lead 52, point 66, arm 20, armature 62, arm 22, contact point 53, lead 67, point 46, arm 21, lead 25, arm 19, point 50, lead 65 and terminal 39.

When the contact arm bridges the gap as shown for the arm 11, if the corresponding switches are closed, both relay coils 17 and 18 will be energized, attracting all four arms 19, 20, 21 and 22. As a result, the motor armature 62 will be short circuited by the arms 20, 22, against the lead 52, causing the motor to be stopped by dynamic braking, the shunt field winding 63 being then short circuited, and winding 63' connected across the terminals 24, 39. The motor will be therefore quickly stopped.

When a selected contact arm engages the corresponding short segment, the relay 18 will be energized, attracting the arms 21 and 22. Current will then flow from the terminal 24 through the lead 52, arm 22, armature 62, arm 20, point 54, lead 65 and terminal 39. Direction of the current through the armature being reversed, the motor rotation will be also reversed. At the same time, the opposing winding 63' will be short circuited by the lead 68, point 47, arm 21, lead 25, arm 19, point 51 and lead 52 so that the motor will therefore rotate at a reduced speed.

When the contact arm engages the insulated portion of the disc 5 or 6, both relays are deenergized, the arms resting in the contact point 51, 54, 46, 53 as shown. Current will flow from the terminal 24 through the lead 52, point 51, arm 19, lead 25, arm 21, point 46, lead 67, arm 22, armature 62, arm 20, point 54 and lead 65 to the terminal 39. The motor will rotate in the same direction as when the short segment 1 or 3 is engaged by the contact arm but at a high speed, the field being weakened by the opposing winding 63'.

When the gap between the selected energized conducting segments is bridged by the corresponding arm 10 or 11, all four arms will be raised and the motor armature will be short circuited by the arms 20, 22 being connected to the lead 52. The shunt winding 63 will be short circuited and the motor will be stopped by dynamic braking under action of the field of the winding 63'.

Figure 3:
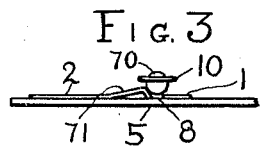
Fig. 3 is a detail view of control elements.

As further means to suppress hunting or oscillating of the motor when the gap is reached by the contact member, the conducting members may be constructed with raised ends as disclosed in my application Serial No. 357,660, filed September 20, 1940, now Patent No. 2,342,717. A modification of this arrangement is shown in Fig. 3, in which the long segment 2 is provided with a raised portion 71, gradually rising toward the gap and abruptly ending in the gap, the short segment being flat or low.

The contact point 70 in the form of a ball is yieldably held in the gap when moving at a slow rate of speed toward the segment 2, thereby facilitating stopping of the motor and preventing hunting or oscillation.

It is understood that any suitable D. C. or A. C. motor or, generally, drive means may be used with my system, employing, or being controlled by, direct or alternating current.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. In a remote control apparatus for placing a load in a selected one of a plurality of predetermined positions, in combination a reversible motor for moving the load, said motor having an armature and a shunt field winding, including an oppositely wound portion and connected in circuit with a source of current, a plurality of selectors, each of the selectors having a pair of relatively movable members, one of the members of each pair comprising two electrically conducting elements separated by a neutral point, drive means under the control of the motor for moving one of the members of each selector, a pair of relays each having two armatures and a coil, the coil of one relay being connected to one conducting element of each pair and the coil of the other relay to the other conducting element of each pair, the other member of each pair of control members comprising a contact element engageable with either one of the respective conducting elements to energize the respective relay coil connected therewith, circuit means including the armatures of both the relays and the motor armature, switch means for selectively energizing one of the said plurality of selectors, one of said relays being arranged to complete, when energized, a circuit energizing the motor armature for rotation of the motor in a predetermined direction, the other of said relays being arranged to complete, when energized, a circuit energizing the motor armature for rotation in the opposite direction, one of said relays being further arranged to complete a second circuit supplementary to the respective motor armature circuit for short circuiting said opposing shunt field winding portion, thereby increasing the motor field strength to reduce the speed of the motor rotation.

2. In a remote control apparatus for placing a load in a selected one of a plurality of predetermined positions, in combination a reversible motor for moving the load, said motor having an armature and a shunt field winding including an oppositely wound portion and connected in circuit with a source of current, a plurality of selectors, each of the selectors having a pair of relatively movable members, one of the members of each pair comprising a long electrically conducting element and a relatively short electrically conducting element separated by a neutral point, drive means under the control of the motor for moving one of the members of each selector, a pair of relays each having two armatures and a coil, the coil of one relay being connected to the long conducting element of each pair and the coil of the other relay to the short conducting element of each pair, the other member of each pair of control members comprising a contact element engageable with the respective long conducting element to energize the relay coil connected therewith, circuit means including the armatures of both the relays and the motor armature, switch means for selectively energizing one of the said plurality of selectors to complete an energizing circuit for the relay coil connected with the long conducting elements to cause the said relay to energize the motor armature circuit for rotation of the motor in a predetermined direction, said relay coil connected with the long conducting elements being de-energized when the contact element of the selected selector is in non-engaging relation to the respective long conducting element to complete a second circuit including said relay armatures energizing the motor armature in opposite direction to cause reversal of the motor rotation, the said relay coil connected with the short conducting elements being effective upon energization to complete a circuit supplementary to the said second circuit for short circuiting said opposing shunt field winding portion, thereby reducing the speed motor rotation.

3. In a remote control apparatus for placing a load in a predetermined position, in combination a reversible motor for moving the load, a pair of relatively movable members, one of the members having a long electrically conducting element and a relatively short electrically conducting element separated by a neutral point, the other member having a contact element engageable with the long conducting element to cause the motor to move the load in a predetermined direction and disengageable therefrom to cause the motor to move the load in the opposite direction, one of the said pairs of members being predeterminedly adjustable to relatively displace the neutral point and the contact element according to said predetermined load position, electrical means associated with the short conducting element for reducing the rate of speed of the motor, drive means under control of the motor for moving one member of the said pair of members in a direction to cause alignment of the contact element and the neutral point to stop the motor, the said member, on approaching the long conducting element and the neutral point, anteriorly engaging the said short conducting element to reduce the motor speed, the said member upon reaching the neutral point at reduced speed causing stopping of the motor, and in approaching the neutral point from engagement with the long conductive element overrunning the neutral point into engagement with the short conducting element to reverse the direction of motor rotation to cause the said member to reapproach the neutral point at reduced speed and to stop the motor, and a plurality of additional pairs of relatively movable members, each pair constituting a selector and assigned to a respective one of a plurality of predetermined positions, one member of each pair being independently adjustable for the said relative displacement of the respective neutral point and contact element, and switch means for energizing a selected one of said plurality of selectors, the other member of each pair being moved in unison with the respective members of all other pairs to cause the said alignment of the contact element and the neutral point of the selected selector.

MICHEL N. YARDENY.

REFERENCES CITED

The following references are of record in the file of this patent:

UNITED STATES PATENTS

| Number | Name | Date |
|---|---|---|
| 387,714 | Fiske | Aug. 14, 1888 |
| 1,651,852 | Trenor | Dec. 6, 1927 |
| 1,674,143 | Stroud | June 19, 1928 |
| 1,749,842 | Pfretzschner | Mar. 11, 1930 |
| 2,173,656 | Newell | Sept. 19, 1939 |
| 2,180,205 | Hodgman | Nov. 14, 1939 |
| 2,328,055 | Clough | Aug. 31, 1943 |
| 2,342,717 | Yardeny | Feb. 29, 1944 |

FOREIGN PATENTS

| Number | Country | Date |
|---|---|---|
| 345,042 | Great Britain | Mar. 19, 1931 |
| 37,008 | Netherlands | Dec. 16, 1935 |
| 315,287 | Germany | Nov. 3, 1919 |